United States Patent
Whitbeck et al.

(10) Patent No.: US 10,221,806 B2
(45) Date of Patent: Mar. 5, 2019

(54) CYLINDRICAL ENGINE BORE

(71) Applicant: Ford Global Technologies, LLC, Dearborn, MI (US)

(72) Inventors: Rodney G. Whitbeck, Northville, MI (US); David Alan Stephenson, Detroit, MI (US); Keith Raymond Bartle, Sterling Heights, MI (US); David Garrett Coffman, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 15/334,603

(22) Filed: Oct. 26, 2016

(65) Prior Publication Data

US 2017/0045013 A1    Feb. 16, 2017

Related U.S. Application Data

(62) Division of application No. 13/913,865, filed on Jun. 10, 2013, now Pat. No. 9,511,467.

(51) Int. Cl.
| | |
|---|---|
| *F16J 10/00* | (2006.01) |
| *F02F 1/18* | (2006.01) |
| *B24B 5/08* | (2006.01) |
| *F16J 10/02* | (2006.01) |
| *B23B 41/12* | (2006.01) |

(52) U.S. Cl.
CPC ............... *F02F 1/18* (2013.01); *B23B 41/12* (2013.01); *B24B 5/08* (2013.01); *F16J 10/02* (2013.01); *Y10T 408/34* (2015.01)

(58) Field of Classification Search
CPC ..... F02F 1/18; F16J 10/02; B24B 5/08; B23B 41/12; Y10T 408/34

USPC ....................................................... 123/193.2
See application file for complete search history.

(56) References Cited

U.S. PATENT DOCUMENTS

| | | | |
|---|---|---|---|
| 833,261 | A | 10/1906 | Tardif |
| 1,384,456 | A | 7/1921 | Fury |
| 1,432,579 | A | 10/1922 | Vauclain et al. |
| 2,207,909 | A | 7/1940 | Besaw |
| 2,314,902 | A | 3/1943 | Shepard |

(Continued)

FOREIGN PATENT DOCUMENTS

| | | |
|---|---|---|
| CN | 101033533 A | 9/2007 |
| CN | 102152084 A | 8/2011 |

(Continued)

OTHER PUBLICATIONS

German Patent & Trademark Office, German Examination Report for the corresponding German Patent Application No. 10 2013 200 912.7 dated Aug. 28, 2013, 4 pages.

(Continued)

*Primary Examiner* — Marguerite McMahon
(74) *Attorney, Agent, or Firm* — Marla Johnson; Brooks Kushman P.C.

(57) ABSTRACT

A cylinder bore including an inner surface including an axial travel area and an axial non-travel area including two discontinuous axial widths of the cylindrical bore and the axial travel area extending therebetween. A nominal diameter of the axial travel area is greater than that of the axial non-travel area. A plurality of annular grooves is formed in the two discontinuous axial widths of the cylindrical bore.

20 Claims, 6 Drawing Sheets

(56) References Cited

U.S. PATENT DOCUMENTS

| | | |
|---|---|---|
| 2,451,089 A | 10/1948 | Hunter |
| 2,451,689 A | 10/1948 | Nelson |
| 2,456,842 A | 12/1948 | Rutbell |
| 3,031,330 A | 4/1962 | Hornick et al. |
| 3,114,960 A | 12/1963 | Einaudi |
| 3,283,910 A | 11/1966 | Grieselhuber et al. |
| 3,324,496 A | 6/1967 | Haracz |
| 3,325,496 A | 6/1967 | Critchley et al. |
| 3,759,625 A | 9/1973 | Iversen |
| 3,798,724 A | 5/1974 | Czopor |
| 3,833,321 A | 9/1974 | Telang et al. |
| 3,946,474 A | 3/1976 | Hahn et al. |
| 4,248,915 A | 2/1981 | Vinciguerra |
| 4,324,017 A | 4/1982 | Viehe |
| 4,640,240 A * | 2/1987 | Ziegler .......... F16J 10/04 123/193.2 |
| 4,646,479 A | 3/1987 | Walker et al. |
| 4,751,113 A | 6/1988 | Riccio et al. |
| 4,817,342 A | 4/1989 | Martin et al. |
| 4,854,785 A | 8/1989 | Lowe et al. |
| 4,967,458 A | 11/1990 | Rosenberg et al. |
| 5,050,547 A | 9/1991 | Takahashi |
| 5,107,967 A | 4/1992 | Fujita et al. |
| 5,194,304 A | 3/1993 | McCune, Jr. et al. |
| 5,212,738 A | 5/1993 | Chande et al. |
| 5,239,955 A | 8/1993 | Rao et al. |
| 5,332,422 A | 7/1994 | Rao |
| 5,363,821 A | 11/1994 | Rao et al. |
| 5,380,564 A | 1/1995 | Vankuiken, Jr. et al. |
| 5,455,078 A | 10/1995 | Kanzaki |
| 5,466,906 A | 11/1995 | McCune et al. |
| 5,480,497 A | 1/1996 | Zaluzec et al. |
| 5,481,084 A | 1/1996 | Patrick et al. |
| 5,549,425 A | 8/1996 | Bernadic et al. |
| 5,622,753 A | 4/1997 | Shepley et al. |
| 5,648,122 A | 7/1997 | Rao et al. |
| 5,691,004 A | 11/1997 | Palazzolla et al. |
| 5,723,187 A | 3/1998 | Popoola et al. |
| 5,818,006 A | 10/1998 | Habel et al. |
| 5,820,938 A | 10/1998 | Pank et al. |
| 5,872,684 A | 2/1999 | Hadfield et al. |
| 5,873,684 A | 2/1999 | Fiolo |
| 5,884,388 A | 3/1999 | Patrick et al. |
| 5,922,412 A | 7/1999 | Baughman et al. |
| 5,931,038 A | 8/1999 | Higashi |
| 5,958,520 A | 9/1999 | Cook et al. |
| 5,958,521 A | 9/1999 | Zaluzec et al. |
| 5,997,286 A | 12/1999 | Hemsath et al. |
| 6,123,009 A | 9/2000 | Kanayama et al. |
| 6,328,026 B1 | 12/2001 | Wang et al. |
| 6,395,090 B1 | 5/2002 | Shepley et al. |
| 6,441,619 B1 | 8/2002 | Araki et al. |
| 6,589,605 B2 | 7/2003 | Shepley et al. |
| 6,622,685 B2 | 9/2003 | Takashashi et al. |
| 6,856,866 B2 | 2/2005 | Nakao |
| 6,863,931 B2 | 3/2005 | Someno et al. |
| 6,914,210 B2 | 7/2005 | Grossklaus, Jr. et al. |
| 7,089,662 B2 | 8/2006 | Izquierdo et al. |
| 7,165,430 B2 | 1/2007 | Weidmer |
| 7,172,787 B2 | 2/2007 | Torigoe et al. |
| 7,188,416 B1 | 3/2007 | Woehlke et al. |
| 7,220,458 B2 | 5/2007 | Hollis et al. |
| 7,300,231 B1 | 11/2007 | Liu |
| 7,415,958 B2 | 8/2008 | Boehm et al. |
| 7,533,657 B2 | 5/2009 | Onodera |
| 7,568,273 B2 | 8/2009 | Lizumi et al. |
| 7,607,209 B2 | 10/2009 | Lizumi et al. |
| 7,614,272 B2 | 11/2009 | Sekikawa et al. |
| 7,621,250 B2 | 11/2009 | Lizumi et al. |
| 7,758,910 B2 | 7/2010 | Moreau et al. |
| 7,851,046 B2 | 12/2010 | Nishimura et al. |
| 7,862,404 B2 | 1/2011 | Takashima et al. |
| 7,982,435 B2 | 7/2011 | Masuda |
| 8,103,485 B2 | 1/2012 | Plett |
| 8,171,910 B2 | 5/2012 | Tachibana et al. |
| 8,209,831 B2 | 7/2012 | Boehm et al. |
| 8,256,092 B1 | 9/2012 | Woodruff et al. |
| 8,286,468 B2 | 10/2012 | Nishimura et al. |
| 8,381,696 B2 | 2/2013 | Urabe et al. |
| 8,544,379 B2 | 10/2013 | Paul et al. |
| 8,707,541 B2 | 4/2014 | Doerfler et al. |
| 8,726,874 B2 | 5/2014 | Whitbeck et al. |
| 8,752,256 B2 | 6/2014 | Verpoort et al. |
| 8,833,331 B2 | 9/2014 | Schramm et al. |
| 9,032,849 B2 | 5/2015 | Azzopardi |
| 9,109,276 B2 | 8/2015 | Kanai et al. |
| 9,643,265 B2 | 5/2017 | Ast et al. |
| 2001/0018010 A1 | 8/2001 | Kichin |
| 2003/0010201 A1 | 1/2003 | Takahashi et al. |
| 2003/0052650 A1 | 3/2003 | Gunji |
| 2004/0031652 A1 | 2/2004 | Khambekar et al. |
| 2004/0065290 A1 | 4/2004 | Wakade et al. |
| 2004/0079556 A1 | 4/2004 | Cramer et al. |
| 2005/0064146 A1 | 3/2005 | Hollis et al. |
| 2005/0084341 A1 | 4/2005 | Long et al. |
| 2005/0137829 A1 | 7/2005 | Gimelfarb et al. |
| 2005/0236268 A1 | 10/2005 | Mishima et al. |
| 2006/0021809 A1 | 2/2006 | Xu et al. |
| 2006/0100833 A1 | 5/2006 | Plett |
| 2007/0000129 A1 | 1/2007 | Hahn et al. |
| 2007/0012177 A1 | 1/2007 | Miyamoto et al. |
| 2007/0078521 A1 | 4/2007 | Overholser et al. |
| 2007/0212519 A1 | 9/2007 | Nishimura et al. |
| 2008/0170921 A1 | 7/2008 | Sjoo |
| 2008/0244891 A1 | 10/2008 | Lizumi et al. |
| 2008/0245226 A1 | 10/2008 | Lizumi et al. |
| 2008/0252412 A1 | 10/2008 | Larsson et al. |
| 2008/0260958 A1 | 10/2008 | Sekikawa et al. |
| 2009/0031564 A1 | 2/2009 | Meier |
| 2009/0058366 A1 | 3/2009 | Masuda |
| 2009/0136308 A1 | 5/2009 | Newitt et al. |
| 2009/0175571 A1 | 7/2009 | Boehm et al. |
| 2010/0000090 A1 | 1/2010 | Moss et al. |
| 2010/0031799 A1 | 2/2010 | Ast et al. |
| 2010/0101526 A1 | 4/2010 | Schaefer et al. |
| 2010/0105292 A1 | 4/2010 | Nagel et al. |
| 2010/0139607 A1 | 6/2010 | Herbst-Dederichs et al. |
| 2010/0316798 A1 | 12/2010 | Takahashi et al. |
| 2010/0326270 A1 | 12/2010 | Doerfler et al. |
| 2011/0000085 A1 | 1/2011 | Kanai et al. |
| 2011/0023777 A1 | 2/2011 | Nishimura et al. |
| 2011/0030663 A1 | 2/2011 | Verpoort et al. |
| 2011/0297118 A1 | 12/2011 | Izawa et al. |
| 2012/0018407 A1 | 1/2012 | Schramm et al. |
| 2012/0321405 A1 | 12/2012 | Weisel |
| 2013/0047947 A1 | 2/2013 | Whitbeck et al. |
| 2013/0108384 A1 | 5/2013 | Yoshiba et al. |
| 2013/0199490 A1 | 8/2013 | Schramm et al. |
| 2013/0287506 A1 | 10/2013 | Morgulis et al. |
| 2013/0291823 A1 | 10/2013 | Morgulis |
| 2014/0248968 A1 | 9/2014 | Kojima et al. |
| 2014/0360355 A1 | 12/2014 | Whitbeck et al. |
| 2014/0364042 A1 | 12/2014 | Whitbeck et al. |
| 2015/0107076 A1 | 4/2015 | Maki et al. |
| 2015/0292432 A1 | 10/2015 | Stephenson et al. |
| 2016/0169149 A1 | 6/2016 | Hahn et al. |
| 2017/0120348 A1 | 5/2017 | Stephenson et al. |
| 2017/0120350 A1 | 5/2017 | Stephenson et al. |
| 2017/0120352 A1 | 5/2017 | Stephenson et al. |

FOREIGN PATENT DOCUMENTS

| | | |
|---|---|---|
| CN | 102168568 A | 8/2011 |
| DE | 4411296 A1 | 7/1995 |
| DE | 19508687 | 10/1995 |
| DE | 19508687 A1 | 10/1995 |
| DE | 4447514 A1 | 2/1996 |
| DE | 19919024 | 11/2000 |
| DE | 10316919 A1 | 10/2004 |
| DE | 102004017714 A1 | 6/2005 |
| DE | 102004052211 A1 | 4/2006 |
| DE | 102005055984 A1 | 5/2007 |
| DE | 60131096 | 2/2008 |
| DE | 102006045275 | 2/2008 |

(56) References Cited

FOREIGN PATENT DOCUMENTS

| | | |
|---|---|---|
| DE | 102006057641 A1 | 6/2008 |
| DE | 102007030876 A1 | 1/2009 |
| DE | 102008022225 | 11/2009 |
| DE | 102008024313 | 12/2009 |
| DE | 102008026146 A1 | 12/2009 |
| DE | 102008058452 | 2/2010 |
| DE | 102009008741 | 8/2010 |
| DE | 102010014689 | 10/2011 |
| DE | 102010052735 A1 | 11/2011 |
| DE | 102010053327 A1 | 6/2012 |
| EP | 0716158 | 6/1996 |
| EP | 0903422 | 3/1999 |
| EP | 0919715 | 6/1999 |
| EP | 0816527 B1 | 7/2000 |
| EP | 1103341 A1 | 5/2001 |
| EP | 1408134 A1 | 4/2004 |
| EP | 1416063 A1 | 5/2004 |
| EP | 1504833 A1 | 2/2005 |
| EP | 1559807 | 8/2005 |
| EP | 1854903 | 11/2007 |
| EP | 1967601 A2 | 9/2008 |
| FR | 1354895 A | 2/1964 |
| FR | 2884889 A1 | 10/2006 |
| GB | 304117 A | 8/1929 |
| GB | 631362 A | 11/1949 |
| GB | 1015036 A | 12/1965 |
| JP | 60-230975 A | 11/1985 |
| JP | 61163260 A | 7/1986 |
| JP | 1-246352 A | 10/1989 |
| JP | H0518316 A | 1/1993 |
| JP | H06-65711 A | 3/1994 |
| JP | 08111582 A | 4/1996 |
| JP | 2001245457 | 9/2001 |
| JP | 2003-155410 A | 5/2003 |
| JP | 4-201075 A | 11/2003 |
| JP | 2003311517 A | 11/2003 |
| JP | 2005336556 A | 12/2005 |
| JP | 2006083826 A | 3/2006 |
| JP | 2006097045 | 4/2006 |
| JP | 2006097046 | 4/2006 |
| JP | 2007-056793 A | 3/2007 |
| JP | 2007-239543 A | 9/2007 |
| JP | 2007277607 | 10/2007 |
| JP | 2008-121073 A | 5/2008 |
| JP | 2010209454 A | 9/2010 |
| JP | 2010275898 | 12/2010 |
| RU | 2297314 C2 | 4/2007 |
| SU | 1310181 A1 | 5/1987 |
| WO | 0037789 | 6/2000 |
| WO | 0037789 A1 | 6/2000 |
| WO | 2002040850 A1 | 5/2002 |
| WO | 2005040446 A1 | 5/2005 |
| WO | 20050404446 A1 | 6/2005 |
| WO | 20050273425 | 8/2005 |
| WO | 2006040746 A2 | 4/2006 |
| WO | 2006061710 | 6/2006 |
| WO | 2006061710 A1 | 6/2006 |
| WO | 2007007821 A1 | 1/2007 |
| WO | 2007087989 | 8/2007 |
| WO | 2008034419 | 3/2008 |
| WO | 2010015229 | 2/2010 |
| WO | 2011161346 | 12/2011 |
| WO | 2015124841 A1 | 8/2015 |

OTHER PUBLICATIONS

Machine Translation for JP 2001245457, 21 pages.
European Patent Office, European Search Report for the corresponding EP Application No. 10167055.2 dated Oct. 11, 2011, 7 pages.
International Patent Bureau, International Search Report dated Oct. 14, 2009 for the corresponding German Patent Application No. DE 10 2008 019 933.8 filed Apr. 21, 2008 and the PCT/EP2009/054670 filed Apr. 20, 2009, 3 pages.
C. Werporrt, W. Blume, R. Ehrenpreis, Ford Motor Company, ICES-2006-1391, Proceedings of ICES2006, Therma Spraying of Aluminum Cylinder Bores by the Ford PTWA Spray Process, 2006 Internal Combustion Engine Division Spring Technical Conference May 7-10, 2006, Aachen, Germany, 6 pages.
Eberhard Kretzschmar, The Metal Spraying Process and its Application in our history, Veb Carl Marhold Publishing House, Halle (Salle), 1953, 11 pages.
Applicants' Statement of Relevance in Accordance With 37 C.F.R. 1.98(a)(3)(i) for IDS Reference JP 2001-245457, 1 page.
Japanese Patent Office, Japanese Office Action for Japanese Patent Application No. 2010-139542, 2 pages.
German Patent and Trademark Office, German Search Report for the corresponding German Patent Application No. DE 10 2009 027 3-45 dated Mar. 8, 2010, 2 pages.
European Patent Office, European Search Report for the corresponding European Patent Application No. 12192730.5-1353 dated Feb. 21, 2013, 5 pages.
Peter Ernst, Gerard Barbezat, Thermal Spray Applications in Powertrain Contribute to the Savings of Energy and Material Resources, Sulzer Metco AG Switzerland, Rigackerstrasse 16, 5610 Wohlen, Switzerland , 8 pages.
Journal of Thermal Spray Technology, JTTEE5 16: 181-182, In The News, Conference and Workshop Information, vol. 16(2) Jun. 2007, 1 page.
Non-final Office Action dated Dec. 12, 2013 for U.S. Appl. No. 13/538,151, filed Jun. 29, 2012, pp. 1-13.
Non-final Office Action dated Dec. 4, 2013 for U.S. Appl. No. 13/752,572, filed Jan. 29, 2013, pp. 1-9.
GB Search Report dated May 26, 2017 for GB1618212.3, 2 pages.
GB Search Report dated Mar. 6, 2017 for GB1618208.1, 5 pages.
GB Search Report dated Mar. 16, 2017 for GB1618212.3, 4 pages.
GB Search Report dated Mar. 17, 2017 for GB1618213.3, 4 pages.
Translation of JP2007-277607 para. 0012 Google Mach. Translation.
Chinese Office Action dated May 31, 2016 for corresponding CN Application No. 201310149575.5, 6 Pages.
Chinese Office Action dated Feb. 3, 2017 for corresponding CN Application No. 201310149575.5, 5 pages.
Chinese Office Action dated Sep. 5, 2017 for corresponding CN Application No. 201410249667, 2 pages.
Chinese Office Action dated Oct. 15, 2018 for S.N. 201310149575. 5, 5 pages.
German Office Action dated Sep. 14, 2018 for S.N. 102013207637. 1, 5 pages.

* cited by examiner

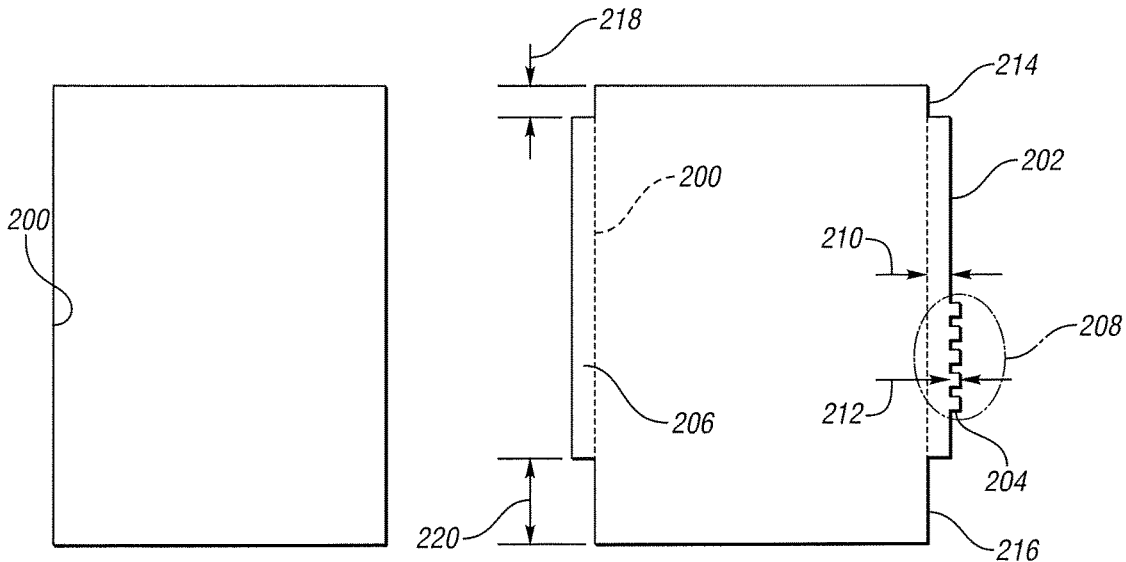
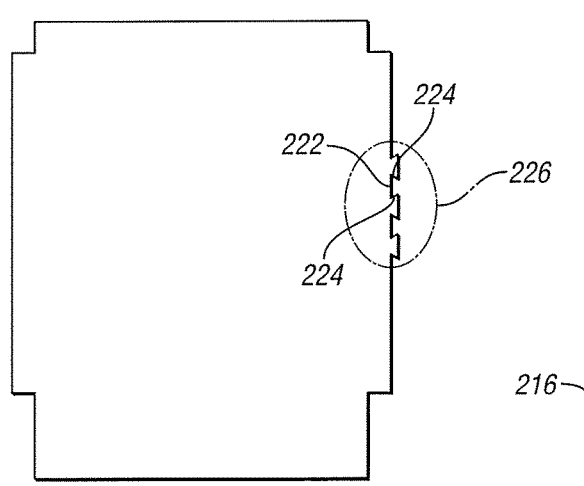
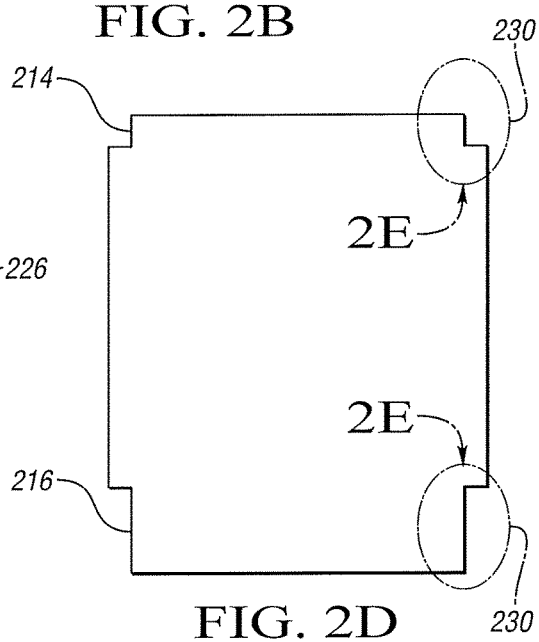
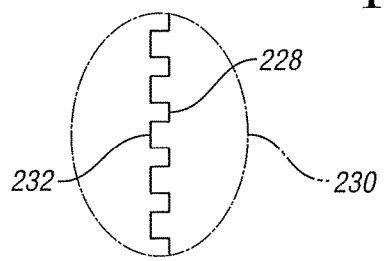
FIG. 2A
FIG. 2B
FIG. 2C
FIG. 2D
FIG. 2E

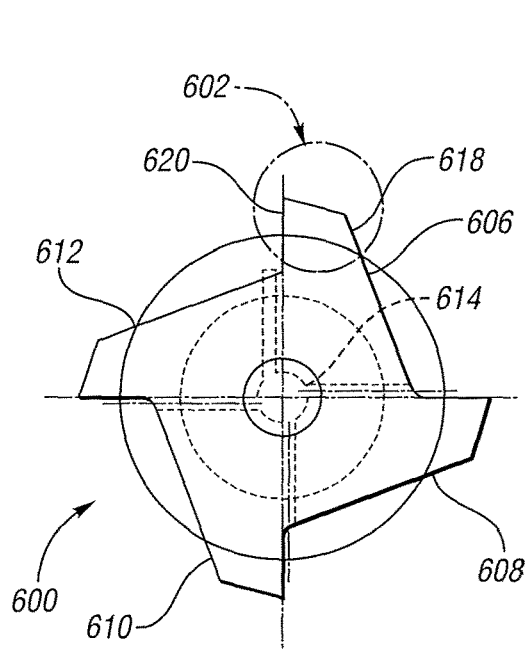
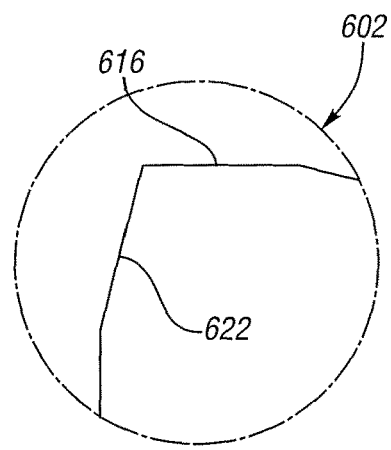
FIG. 6B
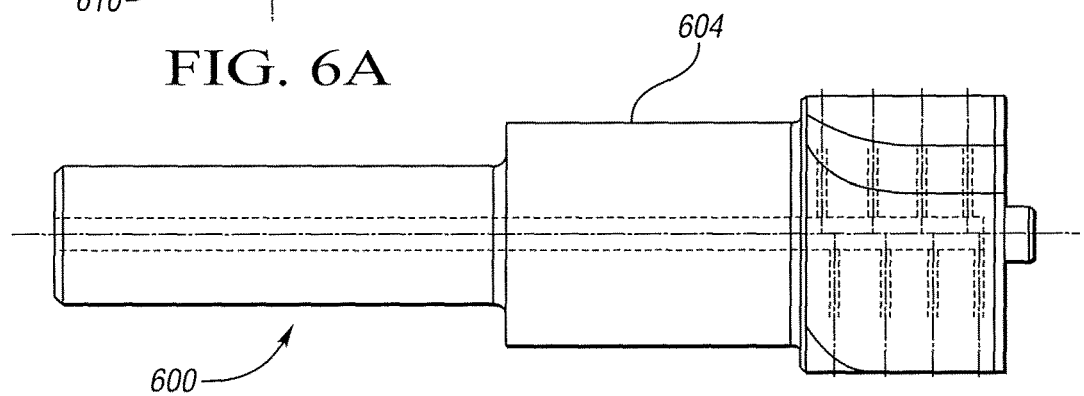
FIG. 6C
FIG. 6A
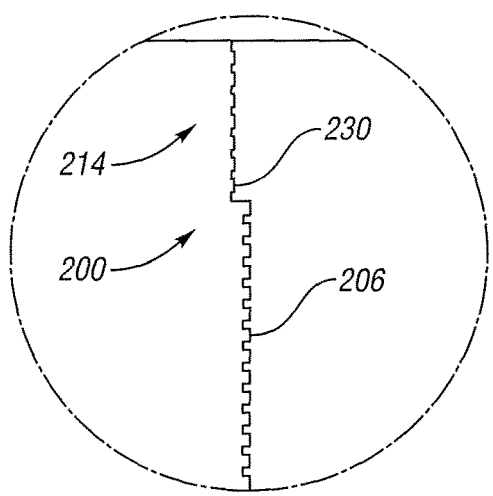
FIG. 7

CYLINDRICAL ENGINE BORE

CROSS-REFERENCE TO RELATED APPLICATIONS

This application is a division of Ser. No. 13/913,865, filed Jun. 10, 2013, issued as U.S. Pat. No. 9,511,467 on Dec. 6, 2016. This application is also related to the application having Ser. No. 13/461,160, filed May 1, 2012, issued as U.S. Pat. No. 8,726,874 on May 20, 2014. This application is also related to the application having Ser. No. 13/913,871, filed Jun. 10, 2013, the disclosures of which are hereby incorporated in their entirety by reference herein.

TECHNICAL FIELD

The present invention relates to cylindrical surfaces of cylindrical engine bores.

BACKGROUND

Automotive engine blocks include a number of cylindrical engine bores. The inner surface of each engine bore is machined so that the surface is suitable for use in automotive applications, e.g., exhibits suitable wear resistance and strength. The machining process may include roughening the inner surface and subsequently applying a metallic coating to the roughened surface and subsequently honing the metallic coating to obtain a finished inner surface. Various surface roughening techniques are known in the art, but have suffered from one or more drawbacks or disadvantages.

SUMMARY

In a first embodiment, a cylinder bore is disclosed. The cylinder bore includes an inner surface including an axial travel area and an axial non-travel area including two discontinuous axial widths of the cylindrical bore and the axial travel area extending therebetween. A nominal diameter of the axial travel area is greater than that of the axial non-travel area. A plurality of annular grooves is formed in the two discontinuous axial widths of the cylindrical bore.

In a second embodiment, a cylinder bore is disclosed. The cylinder bore includes first and second axial non-travel inner surface portions and an axial travel inner surface portion extending therebetween. A nominal diameter of the axial travel inner surface portion is greater than that of the first and second axial non-travel inner surface portions. A plurality of the annular grooves is formed in each of the first and second axial non-travel inner surface portions. A plurality of peaks extends between the plurality of annular grooves.

In a third embodiment, a cylinder bore is disclosed. The cylinder bore includes first and second axial non-travel inner surface portions and an axial travel inner surface portion extending therebetween. A nominal diameter of the axial travel inner surface portion is greater than that of the first and second axial non-travel inner surface portions. A plurality of annular grooves is formed in each of the first and second axial non-travel areas and has a square wave shape of a uniform dimension.

BRIEF DESCRIPTION OF THE DRAWINGS

FIG. 2A depicts a pre-boring step in which an unprocessed cylinder bore inner surface is bored to a diameter;

FIG. 2B depicts an interpolating step in which a travel area is machined using a cutting tool to produce a recessed inner surface with a pocket and annular surface grooves;

FIG. 2C depicts a deforming step in which flat peaks between adjacent grooves are deformed to obtain deformed peaks;

FIG. 2D depicts an interpolating step in which one or more of the non-travel areas are machined using a cutting tool to form annular grooves;

FIG. 2E shows a magnified, schematic view of annular grooves formed in the non-travel areas of an engine bore;

FIGS. 6A, 6B and 6C illustrate a swiper tool according to one embodiment; and

FIG. 7 illustrates a magnified, cross-sectional view of the inner surface of a cylinder bore.

DETAILED DESCRIPTION

Reference will now be made in detail to embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material are to be understood as modified by the word "about" in describing the broadest scope of the present invention.

Automotive engine blocks include a number of cylindrical engine bores. The inner surface of each engine bore is machined so that the surface is suitable for use in automotive applications, e.g., exhibits suitable wear resistance and strength. The machining process may include roughening the inner surface and subsequently applying a metallic coating to the roughened surface and subsequently honing the metallic coating to obtain a finished inner surface with requisite strength and wear resistance. Alternatively, a liner material having requisite strength and wear resistance characteristics may be applied to the unfinished inner surface of the engine bore.

Embodiments disclosed herein provide cutting tools and processes for roughening the inner surface of cylindrical bores, e.g., engine bores, to enhance the adhesion and bonding of a subsequently applied metallic coating, e.g., thermal spray coating, onto the inner surface. Accordingly, the finished inner surface may have enhanced strength and wear resistance.

Figure 1:
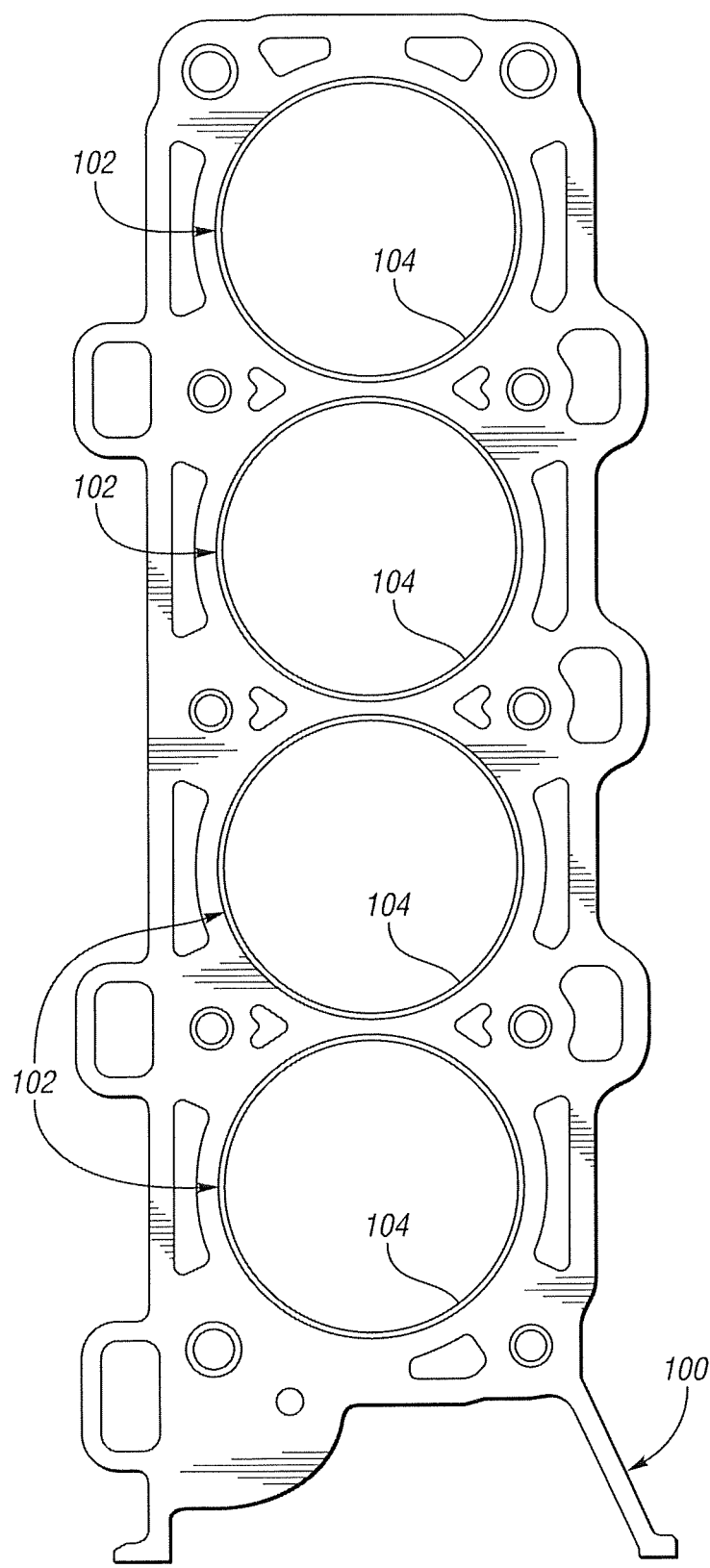
FIG. 1 depicts a top view of a joint or deck face of an exemplary engine block of an internal combustion engine.

FIG. 1 depicts a top view of a joint face of an exemplary engine block 100 of an internal combustion engine. The engine block includes cylinder bores 102, each of which includes an inner surface portion 104, which may be formed of a metal material, such as, but not limited to, aluminum, magnesium or iron, or an alloy thereof, or steel. In certain applications, aluminum or magnesium alloy may be utilized because of their relatively light weight compared to steel or iron. The relatively light weight aluminum or magnesium alloy materials may permit a reduction in engine size and weight, which may improve engine power output and fuel economy.

FIGS. 2A, 2B, 2C, 2D and 2E depict cross-sectional views of a cylinder bore inner surface relating to steps of a process for applying a profile to the inner surface of the cylinder bore. FIG. 2A depicts a pre-boring step in which an unprocessed cylinder bore inner surface 200 is bored to a diameter that is less than the diameter of the finished, e.g., honed, diameter of the inner surface. In some variations, the difference in diameter is 150 to 250 microns (μms). In other variations, the difference in diameter is 175 to 225 microns. In one variation, the difference in diameter is 200 microns.

FIG. 2B depicts an interpolating step in which a travel area 202 is machined into the pre-bored inner surface 200 using a cutting tool. Interpolation-based roughening can be accomplished with a cutting tool suitable for cylinder bores of varying diameter. The cutting tool can be used to roughen only a selected area of the bore, such as the ring travel area of the bore. Roughening only the ring travel portion of the bore may reduce coating cycle time, material consumption, honing time and overspray of the crank case.

The length of the travel area corresponds to the distance in which a piston travels within the engine bore. In some variations, the length of travel area 202 is 90 to 150 millimeters. In one variation, the length of travel area 202 is 117 millimeters. The travel area surface is manufactured to resist wear caused by piston travel. The cutting tool forms annular grooves 204 (as shown in magnified area 208 of FIG. 2B) and a pocket 206 into the travel area 202. It should be understood that the number of grooves shown in magnified area 208 are simply exemplary. Dimension 210 shows the depth of pocket 206. Dimension 212 shows the depth of annular grooves 204. In some variations, the groove depth is 100 to 140 microns. In another variation, the groove depth is 120 microns. In some variations, the pocket depth is 200 to 300 microns. In another variation, the pocket depth is 250 microns.

The pre-bored inner surface 200 also includes non-travel portions 214 and 216. These areas are outside the axial travel distance of the piston. Dimensions 218 and 220 show the length of non-travel portions 214 and 216. In some variations, the length of non-travel area 214 is 2 to 7 millimeters. In one variation, the length of non-travel area 214 is 3.5 millimeters. In some variations, the length of non-travel area 216 is 5 to 25 millimeters. In one variation, the length of non-travel area 216 is 17 millimeters. The cutting tool and the interpolating step are described in greater detail below.

FIG. 2C depicts a deforming step in which the flat peaks between adjacent grooves 204 are deformed to obtain deformed peaks 222 in which each peak 222 includes a pair of undercuts 224, as shown in magnified area 226 of FIG. 2C. It should be understood that the number of deformed peaks shown in magnified area 226 are simply exemplary. The deforming step may be carried out using a swiping tool. The swiping tool and the deforming step are described in greater detail below.

FIG. 2D depicts an interpolating step in which one or more of the non-travel areas 214 and 216 are machined using a cutting tool to form annular grooves 228, as shown in magnified area 230 of FIG. 2E. Flat peaks 232 extend between annular grooves 228. It should be understood that the number of grooves shown in magnified area 230 are simply exemplary. In one embodiment, the grooves form a square wave shape of a uniform dimension. In some variations, the dimension is 25 to 100 microns. In one variation, the dimension is 50 microns. As described in more detail below, the cutting tool may form a profile of grooves within one or more of the non-travel areas 214 and 216.

Figure 3C:
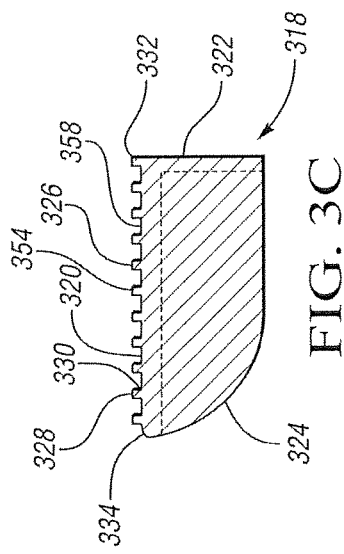
FIGS. 3C, 3D and 3E depict cross-sectional, schematic views of first and second groove cutting elements and pocket cutting elements taken along lines 3C-3C, 3D-3D and 3E-3E of FIG. 3A, respectively.
Figure 3D:
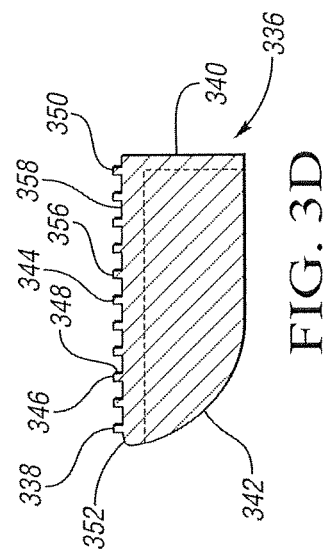
Figure 3E:
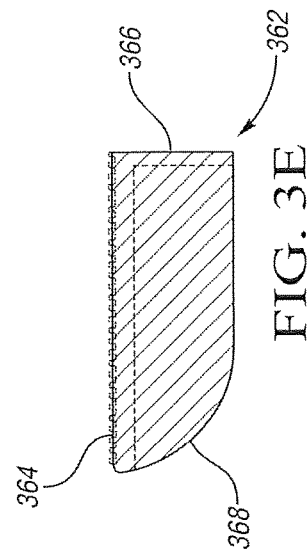
Figure 3A:
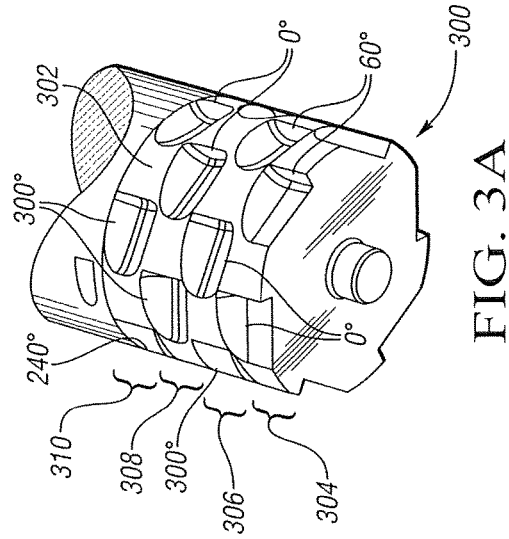
FIG. 3A depicts a perspective view of a cutting tool according to one embodiment.

FIG. 3A depicts a perspective view of a cutting tool 300 according to one embodiment. Cutting tool 300 includes a cylindrical body 302 and first, second, third and fourth axial rows 304, 306, 308 and 310 of cutting elements. Cylindrical body 302 may be formed of steel or cemented tungsten carbide. The cutting elements may be formed of a cutting tool material suitable for machining aluminum or magnesium alloy. The considerations for selecting such materials include without limitation chemical compatibility and/or hardness. Non-limiting examples of such materials include, without limitation, high speed steel, sintered tungsten carbide or polycrystalline diamond. Each axial row 304, 306, 308 and 310 includes 6 cutting elements. As shown in FIG. 3A, the 6 cutting elements are equally radially spaced apart from adjacent cutting elements. In other words, the six cutting elements are located at 0, 60, 120, 180, 240, and 300 degrees around the circumference of the cylindrical body 302. While 6 cutting elements are shown in FIG. 3A, any number of cutting elements may be used according to one or more embodiments. In certain variations, 2 to 24 cutting elements are utilized.

Figure 3B:
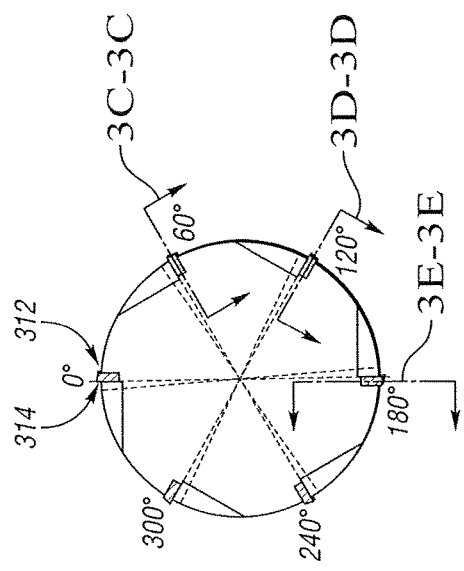
FIG. 3B depicts a top view of cutting tool showing a top axial row of cutting elements.

FIG. 3B depicts a top view of cutting tool 300 showing the first axial row 304 of cutting elements. As shown in FIG. 3B, the 0 degree cutting element includes a cutting surface 312 and a relief surface 314. The other degree cutting elements include similar cutting and relief surfaces. The relief surface can otherwise be referred to as an end face. In the embodiment shown, each of the cutting elements is one of three types of cutting elements, i.e., a first type of groove cutting element (G1), a second type of groove cutting element (G2) and a pocket cutting element (P). In the embodiment shown in FIG. 3B, the 60 and 240 degree cutting elements are the first type of groove cutting element; the 120 and 300 degree cutting elements are the second type of groove cutting element; and the 0 and 180 degree cutting elements are the pocket cutting element. Accordingly, the sequence of cutting elements from 0 to 300 degrees is G1, G2, P, G1, G2 and P, as shown in FIG. 3B. However, it shall be understood that any sequence of cutting elements is within the scope of one or more embodiments. In some variations, the sequence is G1, P, G2, G1, P and G2 or P, G1, G1, P, G2 and G2. In the embodiment shown, two groove cutting elements are necessary due to the width and number of valleys between peaks, which exceed the number and widths which can be cut with one element. For other groove geometries, one or three groove cutting elements may be used. The sequence of cutting is not significant as long as all utilized elements are in the axial row.

In the embodiment shown, the arrangement of teeth on the G1 and G2 cutting elements are dimensioned differently. Regarding G1 shown in FIG. 3C, tooth 332, which is closest to relief surface 322, has an outermost side wall that is flush with relief surface 322. Regarding G2 shown in FIG. 3D, tooth 350, which is closest to relief surface 340, has an outermost side wall that is offset from relief surface 340. As shown in FIG. 3D, the offset is 400 microns. In other variations, the offset may be 0 to 500 microns. Accordingly, there is a 400 micron offset between the relief edge tooth of G1 and relief edge tooth of G2. The relief surface facing side of the sixth tooth 354 of G1 cutting element 318 and the relief surface facing side of the fifth tool 356 of G2 cutting element 336 are offset from each other by 550 microns. These differing dimensions are utilized so that within each row of cutting elements, the G1 and G2 cutting elements can be axially offset from each other. For example, the axial offset may be 550 microns. In this embodiment, this allows the edges to cut two separate rows of grooves, one by each offset element, with acceptable stress on the teeth.

In some variations, there is at least one of G1 and G2 and at least one of P. As shown in FIG. 3A, the cutting elements in each row are offset or staggered circumferentially from one another between each row, e.g., each cutting element of the 0, 60, 120, 180, 240 and 300 degree cutting elements is staggered by 60 degrees in adjacent rows. The staggering improves the lifetime of the cutting tool by smoothing out the initial cutting of the inner surface profile. If the cutting elements are aligned between adjacent rows, more force would be necessary to initiate the cutting operation, and may cause more wear on the cutting elements or deflection and vibration of the tool.

FIGS. 3C, 3D and 3E depict cross-sectional, schematic views of G1, G2 and P cutting elements taken along lines 3C-3C, 3D-3D and 3E-3E of FIG. 3B, respectively. Referring to FIG. 3C, a G1 cutting element 318 is shown having cutting surface 320, relief surface 322 and locating surface 324. The cutting surface 320 schematically includes a number of teeth 326. It should be understood that the number of teeth shown are simply exemplary. In certain variations, the number of teeth is 1 to 2 per millimeter of axial length. In one variation, the number of teeth is 1.25 teeth per axial length. Each tooth is rectangular in shape, although other shapes, e.g., square shapes, are contemplated by one or more embodiments. Each tooth has a top surface 328 and side surfaces 330. As shown in FIG. 3C, the length of top surface 328 is 250 microns and the length of side surfaces 330 is 300 microns. In other variations, the length of the top surface is 200 to 400 microns and the length of the side surfaces is 200 to 500 microns. Flat valleys 358 extend between adjacent teeth 326. As shown in FIG. 3C, the width of the valley 358 is 550 microns. In other variations, the width of the valley is 450 to 1,000 microns. Cutting element 318 also includes a chamfer 334. In the embodiment shown, chamfer 334 is at a 15 degree angle. This chamfer provides stress relief and ease of mounting of the cutting elements. In the embodiment shown, the cutting elements are replaceable brazed polycrystalline diamond elements. In other embodiments, replaceable tungsten carbide elements mounted in adjustable cartridges may be used.

Referring to FIG. 3D, a G2 cutting element 336 is shown having a cutting surface 338, a relief surface 340 and a locating surface 342. The cutting surface 338 schematically includes a number of teeth 344. It should be understood that the number of teeth shown are simply exemplary. In certain variations, the number of teeth is 1 to 2 teeth per millimeter of axial length. In one variation, the number of teeth is 1.25 per millimeter of axial length. Each tooth is rectangular in shape, although other shapes, e.g., square shapes, are contemplated by one or more embodiments. Each tooth has a top surface 346 and side surfaces 348. As shown in FIG. 3D, the length of top surface 346 is 250 microns and the length of side surfaces 348 is 300 microns. In other variations, the length of the top surface is 200 to 400 microns and the length of the side surfaces is 200 to 500 microns. Tooth 350, which is closest to relief surface 340, has an outermost side wall that is offset from relief surface 340. As shown in FIG. 3D, the offset is 400 microns. In other variations, the offset may be 0 to 500 microns. Flat valleys 358 extend between adjacent teeth 344. As shown in FIG. 3D, the width of the valley 360 is 550 microns. In other variations, the width of the valley is 400 to 1,000 microns. Cutting element 336 also includes a chamfer 352. In the embodiment shown, chamfer 352 is at a 15 degree angle. This chamfer provides stress relief and ease of mounting of the cutting elements. In the embodiment shown, the cutting elements are replaceable brazed polycrystalline diamond elements. In other embodiments, replaceable tungsten carbide elements mounted in adjustable cartridges may be used.

In the embodiment shown, the arrangement of teeth on the G1 and G2 cutting elements are dimensioned differently. Regarding G1 shown in FIG. 3C, tooth 332, which is closest to relief surface 322, has an outermost side wall that is flush with relief surface 322. Regarding G2 shown in FIG. 3D, tooth 350, which is closest to relief surface 340, has an outermost side wall that is offset from relief surface 340. As shown in FIG. 3D, the offset is 400 microns. In other variations, the offset may be 0 to 500 microns. Accordingly, there is a 400 micron offset between the relief edge tooth of G1 and relief edge tooth of G2. The relief surface facing side of the sixth tooth 354 of G1 cutting element 318 and the relief surface facing side of the fifth tool 356 of G2 cutting element 336 are offset from each other by 550 microns. These differing dimensions are utilized so that within each row of cutting elements, the G1 and G2 cutting elements can be axially offset from each other. For example, the axial offset may be 550 microns. In this embodiment, this allows the edges to cut two separate rows of grooves, one by each offset element, with acceptable stress on the teeth.

Referring to FIG. 3E, a P cutting element 362 is shown having a cutting surface 364, relief surface 366 and a locating surface 368. Cutting surface 364 is flat or generally flat, and has no teeth, in contrast to the cutting surfaces of the G1 and G2 cutting elements, which are shown in phantom. The teeth shown in phantom line in FIG. 3E indicates the tooth geometry of the G1 and/or G2 cutting elements and how and the cutting surface 364 is radially offset away from the tooth top surfaces 328 and 346. The P cutting element 362 removes a portion of the peaks between the grooves and creates the pocket. The amount of radial offset controls the depth of the grooves cut in the bottom of the pocket depicted in FIG. 2B. In the illustrated embodiment, the dimension 120 microns in FIG. 3E is the depth of the grooves that are cut when the G1, G2 and P elements are used in combination. The dimension of 50.06 millimeters is the diameter of the cutting tool measured to the top surfaces (minimum diameter) of the teeth that are formed.

Figure 3F:
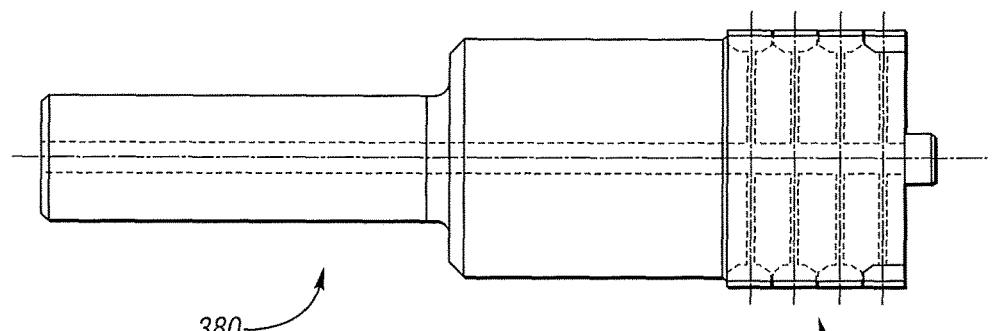
FIG. 3F shows a cylindrical shank for mounting a cutting tool in a tool holder according to one embodiment.

FIG. 3F shows a cylindrical shank 380 for mounting cutting tool 300 into a tool holder for mounting in a machine spindle. In other embodiments, the shank may be replaced by a direct spindle connection, such as a CAT-V or HSK taper connection.

Figure 4A:
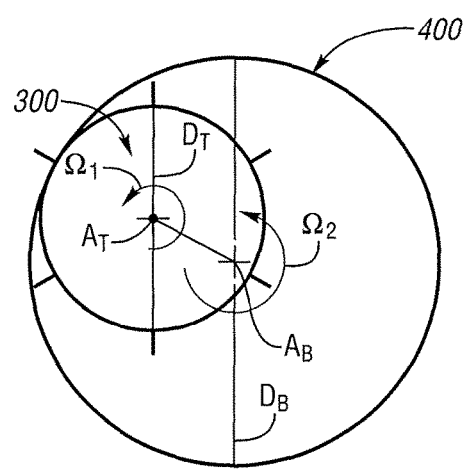
FIG. 4A is a schematic, top view of a cylinder bore according to one embodiment.
Figure 4B:
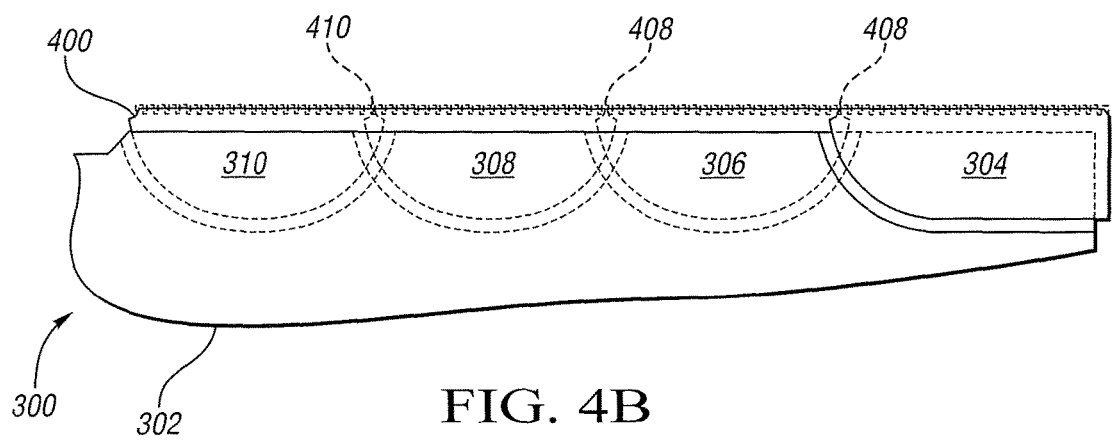
FIG. 4B is a schematic, side view of the cylinder bore of FIG. 4B according to one embodiment.

Having described the structure of cutting tool 300 according to one embodiment, the following describes the use of cutting tool 300 to machine a profile into an inner surface of a cylinder bore. FIG. 4A is a schematic, top view of a cylinder bore 400 according to one embodiment. FIG. 4B is a schematic, side view of cylinder bore 400 according to one embodiment. As shown in FIG. 4A, cutting tool 300 is mounted in a machine tool spindle with an axis of rotation AT parallel to the cylinder bore axis AB. The tool axis AT is offset from the bore axis AB. The spindle may be either a box or motorized spindle. The tool rotates in the spindle about its own axis AT at an angular speed Ω1 and precesses around the bore axis AB at angular speed Ω2. This precession is referred to as circular interpolation. The interpolating movement permits the formation of a pocket and annular, parallel grooves within the inner surface of a cylinder bore.

In one embodiment, the aspect ratio of the diameter of the cutting tool DT to the inner diameter of the bore DB is considered. In certain variations, the inner diameter is substantially greater than the cutting tool diameter. In certain variations, the cutting tool diameter is 40 to 60 millimeters. In certain variations, the inner diameter of the cylinder bore is 70 to 150 millimeters. Given this dimensional difference, this cutting tool may be utilized with a significant variation in bore diameter. In other words, use of the cutting tools of one or more embodiments does not require separate tooling for each bore diameter.

Regarding the pre-boring step of FIG. 2A identified above, a boring bar (not shown) can be attached to a machine spindle to bore a diameter that is less than the diameter of the finished diameter of the inner surface. In certain variations, the feed rate, i.e., the rate in which the boring bar is fed radially outward into the inner surface, of the spindle is 0.1 to 0.3 mm/rev. In one or more embodiments, the spindle is telescoping. In other embodiments, the spindle may be fixed and the bore may move. In another variation, the feed rate is 0.2 mm/rev. In certain variations, the rotational speed of the boring bar is 1,000 to 3,000 rpms. In another variation, the rotational speed of the boring bar is 2,000 rpms.

Regarding the interpolating step of FIG. 2B identified above, the cutting tool 300 is used to machine a profile into the inner surface of cylinder bore 400. In certain variations, the interpolating feed rate (radially outward) of the spindle during this step is 0.1 to 0.3 mm/rev. In another variation, the feed rate is 0.2 mm/rev. In certain variations, the rotational speed of cutting tool 300 is 3,000 to 10,000 rpms. In another variation, the rotational speed of cutting tool 300 is 6,000 rpms.

As described above, cutting tool 300 includes cylindrical body 302 that includes four rows of cutting elements. According to this embodiment, the axial length of the cut is 35 mm. Therefore, if the length of the travel area is 105 mm, three axial steps are used to complete the interpolating of the travel area. In other words, the axial position of the spindle is set at an upper, middle and lower position before rotating the cutting tool at each of the positions. While 4 cutting element rows are shown in one embodiment, it is understood that additional rows may be utilized. For example, 6 rows may be used to cut a similar travel area in 2 axial steps instead of 3. Further, 12 rows may be used to cut a similar travel area in 1 axial step.

Moving to FIG. 4B, a fragmented portion of cylindrical body 302 of cutting tool 300 and cutting elements from axial rows 304, 306, 308 and 310 are schematically shown in overlapping relationship. As described above and shown in this FIG. 4B, there are overlaps 406, 408 and 410 between adjacent cutting element rows. This overlap helps provide uniform and consistent profile cutting in boundary regions.

Figure 5:
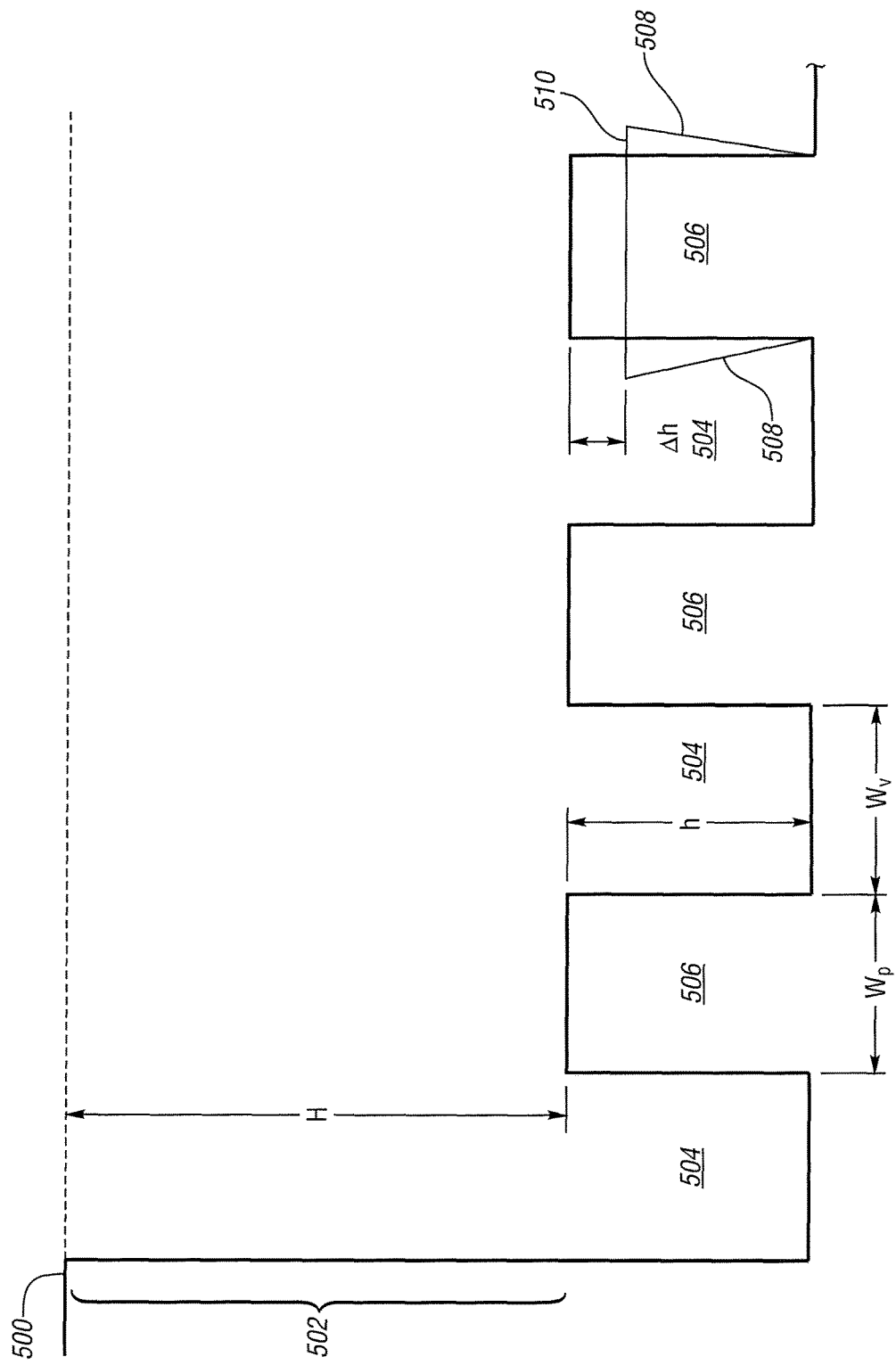
FIG. 5 shows an exploded, fragmented view of the inner surface of the cylinder bore before, during and after an interpolating step.

FIG. 5 shows an exploded, fragmented view of the inner surface 500 of the cylinder bore before, during and after the interpolating step. The cutting tool 300 is fed radially outward into the surface of the cylinder bore at a rate of 0.2 mm per revolution. While the cutting tool 300 is being fed into the inner surface, it is rotating at a speed of 6,000 rpms. The P pocket cutting elements cut pocket 502 into the inner surface 500. The height of the pocket is H and the width is wv. The H value corresponds to the axial offset between the valleys 358 of G1 and G2 cutting elements 318 and 336 and the cutting surface 364 of P cutting element 362. In a non-limiting, specific example, the offset is 250 microns. Therefore, H is 250 microns. The wv value corresponds to the length of the tooth upper surfaces 328 and 356 of the G1 and G2 cutting elements 318 and 336. In the non-limiting, specific example set forth above, the tooth upper surfaces have a length of 250 microns. Accordingly, wv is 250 microns.

The groove cutting elements G1 and G2 remove material 504 to create peaks 506. The height of these peaks is h and the width is wp. In the non-limiting, specific example shown, wp is 150 microns. The h value is determined by the radial offset between the top of groove cutting elements G1 and G2 and the pocket cutting element P. In the non-limiting, specific example set forth above, this offset is 120 microns. Therefore, h is 120 microns. The wv value corresponds to the length of the flat valleys between groove-cutting teeth top surfaces. In the non-limiting, specific example set forth above, the valley length is 250 microns. Accordingly, wv is 250 microns. Given the rotational speed of cutting tool 300, the cutting of the pocket and annular grooves described above occurs simultaneously or essentially simultaneously, e.g., for a period of time equal to a ⅙ revolution of the cutting tool 300, if the cutting tool includes six cutting elements and adjacent elements are groove and pocket cutting elements.

Regarding the deforming step of FIG. 2C above, a swiper tool is used to swipe selective area flat peaks between grooves. As used herein in certain embodiments, "swipe" is one form of deforming the selective areas. In one embodiment, deforming does not include cutting or grinding the selective area. These types of processes typically include complete or at least partial material removal. It should be understood that other deforming processes may be utilized in this step. Non-limiting examples of other secondary processes include roller burnishing, diamond knurling or a smearing process in which the flank of the pocket cutting tool is used as a wiper insert. In certain variations, the feed rate of the spindle during this step is 0.1 to 0.3 mm/rev. In another variation, the feed rate is 0.2 mm/rev. In certain variations, the rotational speed of swiper tool 300 is 5,000 to 7,000 rpms. In another variation, the rotational speed of a swiper tool is 6,000 rpms.

FIGS. 6A, 6B and 6C illustrate a swiper tool 600 according to one embodiment. FIG. 6A shows a top view of swiper tool 600. FIG. 6B shows a magnified view of region 602 of swiper tool 600. FIG. 6C shows a side view of swiper tool 600, including cylindrical shank 604. Swiper tool 600 includes 4 swiping projections 606, 608, 610 and 612. Each swiping projection 606, 608, 610 and 612 project outward from the center 614 of swiper tool 600. In one embodiment, the swiper tool has the same diameter as the cutting tool, and the swiper elements have the same axial length as the cutting elements, so that the swiping tool and the cutting tool may be run over the same tool path to simplify programming and reduce motion errors. Each swiping projection includes relief surface 616, a back surface 618, and a rake surface 620. A chamfer 622 extends between rake surface 620 and relief surface 616. The chamfer or like edge preparation, such as a hone, is used to ensure that the tool deforms the peaks instead of cutting them. In one variation, the angle of the chamfer 622 relative to the landing surface 616 is 15 degrees. In other variations, the angle is 10 to 20 degrees, or a hone with a radius of 25 to 100 microns. In one embodiment, the angle between the rake surface and the relief surface of adjacent swiping projections is 110 degrees.

The swiping tool 602 is dull enough that it does not cut into the inner surface of the cylinder bore. Instead, the swiping tool 602 mechanically deforms grooves formed in the inner surface of the cylinder bore. Moving back to FIG. 5, the swiping tool 600, used according to the methods identified above, created undercuts 508 and elongates upper surface 510. As shown in FIG. 5, the difference between h (the height of the non-deformed peak) and the height of the deformed peak is Δh. In one variation, Δh is 10 microns, while in other variations, Δh may be 5 to 60 microns. The undercuts increase the adhesion of a subsequent thermal spray coating onto the roughened inner surface of the cylinder bore.

The machined surface after the pocket grooving step and the swiping step has one or more advantages over other roughening processes. First, adhesion strength of the metal spray may be improved by using the swiping step instead of other secondary processes, such as diamond knurling, roller burnishing. The adhesion strength was tested using a pull test. The adhesion strength may be in the range of 40 to 70 MPa. In other variations, the adhesion strength may be 50 to 60 MPa. Compared to the adhesion strength of a diamond knurling process, the adhesion strength of swiping is at least 20% higher. Further, the Applicants have recognized that adhesion is independent of profile depth of the grooves after the first processing step. This may be advantageous for at least two reasons. The swiping tool cuts relatively lower profile depths compared to conventional processes, such as diamond knurling, roller burnishing. In certain variations, the reduction in profile depth is 30 to 40%. Accordingly, less metal spray material is necessary to fill the profile while not compromising adhesion strength. Also, any variation in the depth of the grooves does not affect the adhesion strength, which makes the swiping step more robust than conventional processes. As another benefit of one or more embodiments, the swiping tool can be operated at much higher operational speeds than other processes, such as roller burnishing.

Regarding the interpolating step of FIG. 2D above, the cutting tool 300 is used to machine non-travel areas 214 and 216 to form annular grooves. In certain variations, the feed rate of the spindle during this step is 0.1 to 0.3 mm/rev. In another variation, the feed rate is 0.2 mm/rev. In certain variations, the rotational speed of cutting tool 300 is 3,000 to 10,000 rpms. In another variation, the rotational speed of a cutting tool is 6,000 rpms.

These non-travel areas do not require a subsequent metal spray. However, a torch for metal spraying typically stays on throughout the spray process. If these non-ring travel areas are not roughened, then spray metal that is inadvertently sprayed on these areas do not adhere, causing delamination. This delamination may fall into the bore during honing and become entrapped between the honing stones and bore walls, causing unacceptable scratching. The delamination may also fall into the crank case, which would then require removal. As such, by applying the annual grooves identified herein to the non-ring travel areas, thermal spray material adheres during the spray process and mitigates contamination of the intended spray surface and the crank case. The lightly sprayed non-ring travel areas may be easily removed during subsequent honing operation.

FIG. 7 illustrates a magnified, cross-sectional view of the inner surface of cylinder bore 200. Non-travel surface 214 includes annular, square grooves 230. Travel surface 202 includes annular grooves 206 and pocket 208.

While the best mode for carrying out the invention has been described in detail, those familiar with the art to which this invention relates will recognize various alternative designs and embodiments for practicing the invention as defined by the following claims.

What is claimed is:

1. A cylinder bore comprising:
   an inner surface including an axial travel area and an axial non-travel area including two discontinuous axial lengths of the cylindrical bore and the axial travel area extending therebetween, a nominal diameter of the axial travel area is greater than that of the axial non-travel area; and
   a plurality of annular grooves formed in the two discontinuous axial lengths of the cylindrical bore, the axial travel area including a plurality of grooves having a square wave shape of a uniform dimension.

2. The cylinder bore of claim 1, wherein an aspect ratio of a depth of the plurality of annular grooves of the two discontinuous axial lengths to a width of the plurality of annular grooves of the two discontinuous axial lengths is 0.5 or less.

3. The cylinder bore of claim 1, further comprising upper and lower circular edges.

4. The cylinder bore of claim 1, wherein each of the two discontinuous axial lengths of the axial non-travel area is 5 to 25 millimeters.

5. The cylinder bore of claim 1, wherein each of the two discontinuous axial lengths of the axial non-travel area is 2 to 7 millimeters.

6. The cylinder bore of claim 1, wherein the uniform distribution is 25 to 100 microns.

7. The cylinder bore of claim 1, wherein the uniform dimension is 50 microns.

8. A cylinder bore comprising:
   first and second axial non-travel inner surface portions and an axial travel inner surface portion extending therebetween, a nominal diameter of the axial travel inner surface portion is greater than that of the first and second axial non-travel inner surface portions;
   a plurality of annular grooves formed in each of the first and second axial non-travel inner surface portions and the axial travel inner surface portion, the plurality of grooves of the axial travel area having a square wave shape of a uniform dimension; and
   a plurality of peaks extending between the plurality of annular grooves.

9. The cylinder bore of claim 8, wherein the plurality of peaks is a plurality of flat peaks.

10. The cylinder bore of claim 8, wherein an aspect ratio of a depth of the plurality of annular grooves of the first and second axial non-travel inner surface portions to a width of the plurality of annular grooves of the first and second axial non-travel inner surface portions is 0.5 or less.

11. The cylinder bore of claim 8, further comprising upper and lower circular edges.

12. The cylinder bore of claim 8, wherein each of the first and second axial non-travel inner surface portions has an axial length of 5 to 25 millimeters.

13. The cylinder bore of claim 8, wherein each of the first and second axial non-travel inner surface portions has an axial length of 2 to 7 millimeters.

14. A cylinder bore comprising:
   first and second axial non-travel inner surface portions and an axial travel inner surface portion extending therebetween, a nominal diameter of the axial travel inner surface portion is greater than that of the first and second axial non-travel inner surface portions; and a plurality of annular grooves formed in each of the first and second axial non-travel areas of a square wave shape of a uniform dimension.

15. The cylinder bore of claim 14, wherein the uniform dimension is 25 to 100 microns.

16. The cylinder bore of claim 14, wherein the uniform dimension is 50 microns.

17. The cylinder bore of claim 14, wherein an aspect ratio of a depth of the plurality of annular grooves to a width of the plurality of annular grooves is 0.5 or less.

18. The cylinder bore of claim 14, further comprising upper and lower circular edges.

19. The cylinder bore of claim 14, wherein each of the first and second axial non-travel inner surface portions has an axial length of 5 to 25 millimeters.

20. The cylinder bore of claim 14, wherein each of the first and second non-travel inner surface portions has an axial length of 2 to 7 millimeters.

\* \* \* \* \*